United States Patent
Chen et al.

(10) Patent No.: US 8,922,938 B1
(45) Date of Patent: Dec. 30, 2014

(54) DISK DRIVE FILTERING DISTURBANCE SIGNAL AND ERROR SIGNAL FOR ADAPTIVE FEED-FORWARD COMPENSATION

(71) Applicant: Western Digital Technologies, Inc., Irvine, CA (US)

(72) Inventors: Xu Chen, San Diego, CA (US); Jianguo Zhou, Foothill Ranch, CA (US); Wei Xi, Mission Viejo, CA (US); Kuang-Yang Tu, Irvine, CA (US); Guoxiao Guo, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 130 days.

(21) Appl. No.: 13/668,142

(22) Filed: Nov. 2, 2012

(51) Int. Cl.
   *G11B 21/02* (2006.01)
(52) U.S. Cl.
   USPC ......... 360/75; 360/97.16; 360/97.19; 700/29; 700/44; 700/45
(58) Field of Classification Search
   CPC ............. G11B 5/54; G11B 5/56; G05B 17/02
   USPC ............ 318/568.22, 571, 592, 593, 632, 114, 318/115, 139; 360/75, 97.19, 97.16; 700/29, 44, 45, 54, 64, 71, 173, 254, 700/280, 302
   See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |

(Continued)

OTHER PUBLICATIONS

Widrow, B., Glover, J., McCool, J., Kaunitz, J., Williams, C., Hearn, R., Zeidler, J., Eugene Dong, J., Goodlin, R.. "Adaptive noise cancelling: Principles and applications," Proceedings of the IEEE 63 (12), 1692-1716, 1975.

(Continued)

*Primary Examiner* — Antony M Paul

(57) ABSTRACT

A disk drive is disclosed comprising a servo control system operable to actuate a head over a disk. A disturbance signal is generated in response to a vibration, and the disturbance signal is filtered with a first filter comprising a frequency response to generate a filtered disturbance signal. The filtered disturbance signal is filtered with a model of the servo control system to generate a compensated disturbance signal. An error signal of the servo control system is filtered with a second filter comprising the frequency response to generate a filtered error signal. An adaptation control signal is generated in response to the compensated disturbance signal and the filtered error signal, and an adaptive filter is adapted in response to the adaptation control signal, wherein the adaptive filter filters the disturbance signal to generate feed-forward compensation values applied to the servo control system to compensate for the vibration.

20 Claims, 3 Drawing Sheets

(56) References Cited

U.S. PATENT DOCUMENTS

| | | |
|---|---|---|
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,275,592 B1 | 8/2001 | Vartiainen |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 * | 3/2003 | Ryan .................... 360/77.02 |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,674,600 B1 | 1/2004 | Codilian et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,318 B1 | 10/2005 | Ngo |
| 6,952,322 B1 | 10/2005 | Codilian et al. |
| 6,954,324 B1 | 10/2005 | Tu et al. |
| 6,958,881 B1 | 10/2005 | Codilian et al. |
| 6,958,882 B2 | 10/2005 | Kisaka |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,375,916 B2 | 5/2008 | Semba et al. |
| 7,388,728 B1 | 6/2008 | Chen et al. |

(56) References Cited

U.S. PATENT DOCUMENTS

| | | |
|---|---|---|
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,471,483 B1 | 12/2008 | Ferris et al. |
| 7,477,471 B1 | 1/2009 | Nemshick et al. |
| 7,480,116 B1 | 1/2009 | Bennett |
| 7,486,470 B1 | 2/2009 | Semba |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,529,057 B1 | 5/2009 | Sutardja |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,561,365 B2 * | 7/2009 | Noguchi et al. ................. 360/75 |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,633,704 B2 * | 12/2009 | Supino et al. .................... 360/75 |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,777,982 B2 | 8/2010 | Kim et al. |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,027,119 B2 | 9/2011 | Zhang |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |

(56) References Cited

U.S. PATENT DOCUMENTS

| | | |
|---|---|---|
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,797,673 B2 * | 8/2014 | Supino ............ 360/77.07 |
| 8,804,267 B2 | 8/2014 | Huang et al. |
| 2002/0153451 A1 | 10/2002 | Kiss et al. |
| 2004/0213100 A1 | 10/2004 | Iwashiro |
| 2010/0035085 A1 | 2/2010 | Jung et al. |
| 2010/0284546 A1 | 11/2010 | DeBrunner et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

B. Widrow, D. Shur and S. Shaffer, "On Adaptive Inverse Control," Record of the Fifteenth Asilomar Conference on Circuits, Systems and Computers, pp. 185-189, Nov. 1981.

Chi, Hsiang-Feng, Shawn X. Gao, Sigfrid D. Soli and Abeer Alwan, "Band-limited feedback cancellation with a modified filtered-X LMS algorithm for hearing aids," Speech Communication, Jan. 2003, vol. 39, No. 1-2, pp. 147-161.

U.S. Appl. No. 13/458,863, filed Apr. 27, 2012, 23 pages.

U.S. Appl. No. 13/927,096, filed Jun. 25, 2013, 18 pages.

Non-Final Office Action dated Apr. 24, 2014 from U.S. Appl. No. 13/927,096, 16 pages.

* cited by examiner

DISK DRIVE FILTERING DISTURBANCE SIGNAL AND ERROR SIGNAL FOR ADAPTIVE FEED-FORWARD COMPENSATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

Certain conditions may affect the ability of the VCM servo controller to maintain the head along the centerline of a target data track and/or the ability of the DFH servo controller to maintain the target fly height. For example, an external vibration applied to the disk drive or degradation and/or malfunction of the spindle motor that rotates the disks may induce a disturbance in the servo control systems. The degradation caused by such a disturbance may be ameliorated using a feed-forward compensation algorithm.

DETAILED DESCRIPTION

Figure 2A:
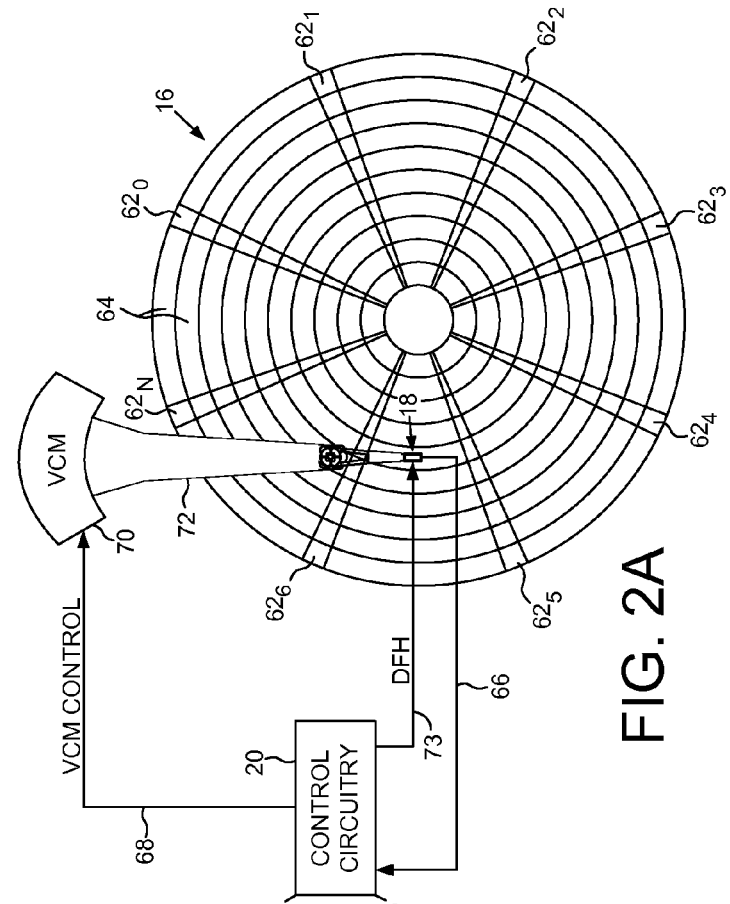
FIG. 2A shows a disk drive according to an embodiment of the present invention comprising a head actuated over a disk by control circuitry comprising a servo control system.
Figure 2B:
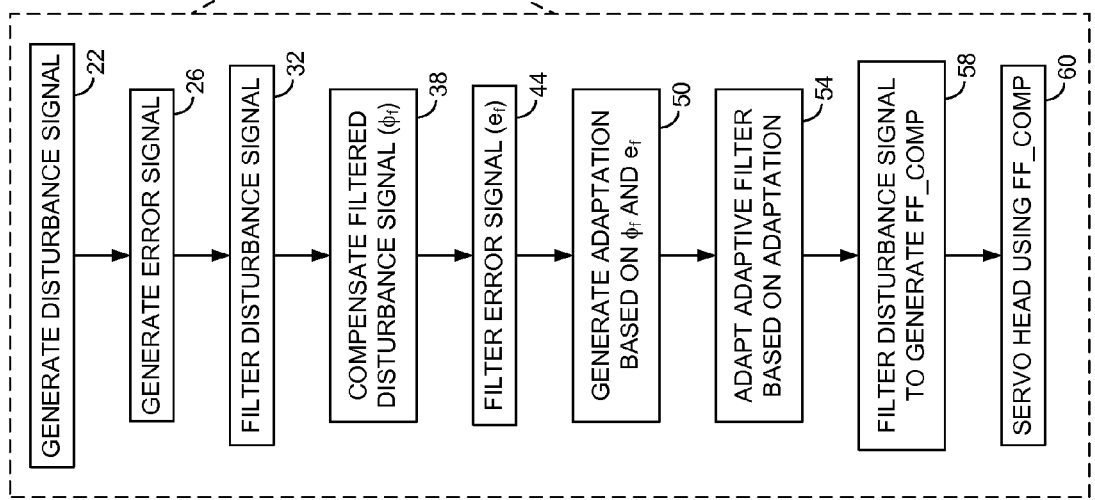
FIG. 2B is a flow diagram according to an embodiment of the present invention wherein feed-forward compensation values are generated for the servo control system in response to a filtered disturbance signal and a filtered error signal.

FIG. 2A shows a disk drive according to an embodiment of the present invention comprising a disk 16, a head 18, and control circuitry 20 comprising a servo control system (FIG. 3) operable to actuate the head 18 over the disk 16. The control circuitry 20 executes the flow diagram of FIG. 2B, wherein a disturbance signal 21 is generated in response to a vibration (block 22), and an error signal 24 of the servo control system is generated (block 26). The disturbance signal 21 is filtered with a first filter 28 comprising a frequency response to generate a filtered disturbance signal 30 (block 32). The filtered disturbance signal 30 is filtered with a model of the servo control system 34 to generate a compensated disturbance signal 36 (block 38). The error signal 24 is filtered with a second filter 40 comprising the frequency response to generate a filtered error signal 42 (block 44). An adaptation control signal 46 is generated 48 in response to the compensated disturbance signal 36 and the filtered error signal 42 (block 50). An adaptive filter 52 is adapted in response to the adaptation control signal 46 (block 54), wherein the adaptive filter 52 filters the disturbance signal 21 to generate feed-forward compensation values 56 (block 58). The feed-forward compensation values 56 are applied to the servo control system to compensate for the vibration (block 60).

Figure 1:
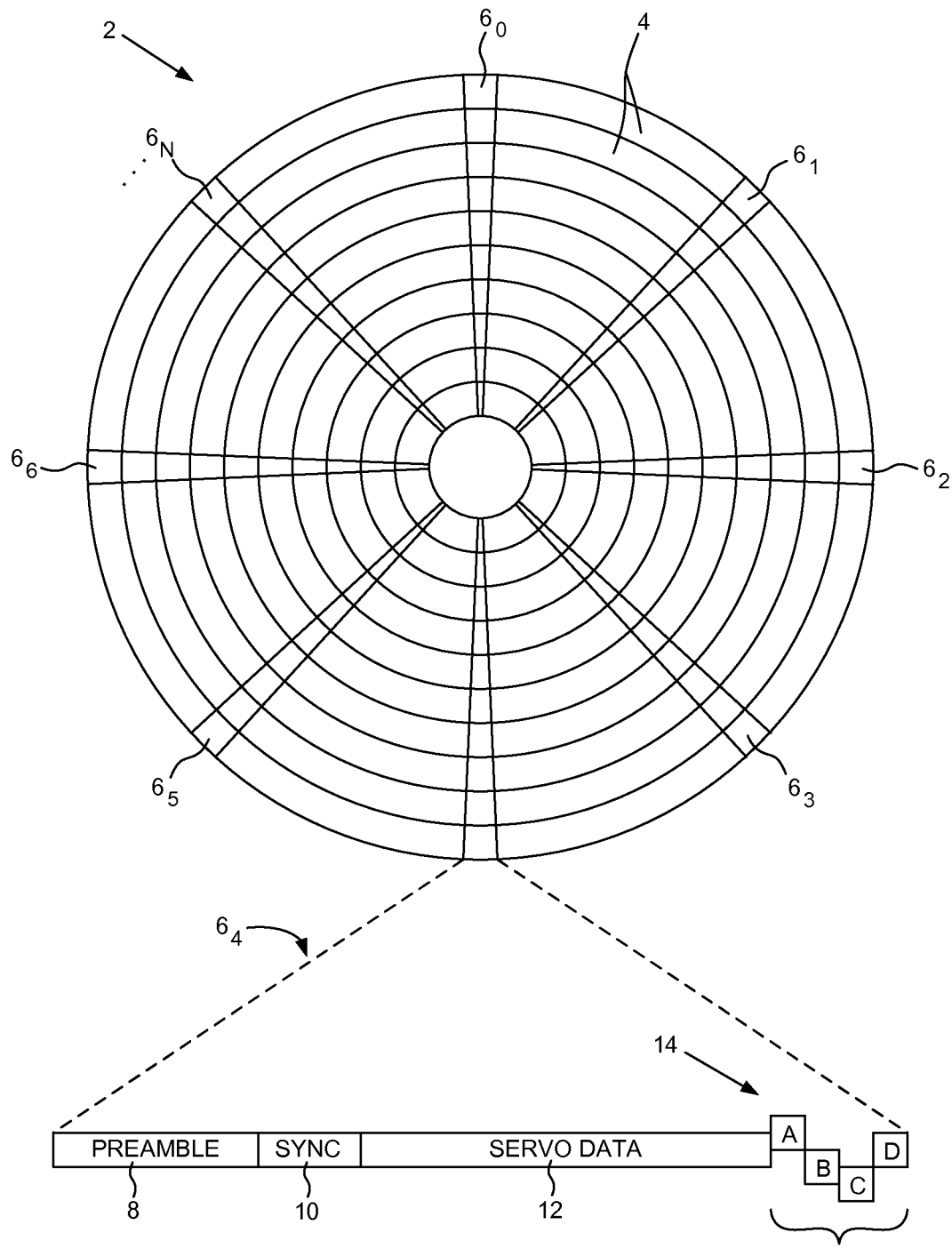
FIG. 1 shows a prior art disk format comprising a plurality of servo tracks defined by servo sectors.

In the embodiment of FIG. 2A, the disk 16 comprises embedded servo sectors $62_0$-$62_N$ that define a plurality of servo tracks 64. The control circuitry 20 processes a read signal 66 emanating from the head 18 to demodulate the servo sectors $62_0$-$62_N$ and generate a position error signal (PES) representing an error between the actual position of the head and a target position relative to a target track. The servo control system 20 filters the PES using a suitable compensation filter to generate a control signal 68 applied to a voice coil motor (VCM) 70 which rotates an actuator arm 72 about a pivot in order to actuate the head 18 radially over the disk 16 in a direction that reduces the PES. The servo sectors $62_0$-$62_N$ may comprise any suitable position information, such as a track address for coarse positioning and servo bursts for fine positioning. The servo bursts may comprise any suitable pattern, such as the amplitude-based servo pattern shown in FIG. 1, or a suitable phase-based servo pattern.

In one embodiment, the disk drive comprises a suitable microactuator, such as a suitable piezoelectric actuator, for actuating the head 18 in fine movements radially over the disk 16. The microactuator may be implemented in any suitable manner, such as a microactuator that actuates a suspension relative to the actuator arm 72, or a microactuator that actuates a head gimbal relative to the suspension. In one embodiment, feed-forward compensation values 56 may be generated in response to the disturbance signal 21 for use in the microactuator servo control system in addition to, or instead of, generating feed-forward compensation values 56 for the VCM servo control system.

In one embodiment, the head 18 may comprise a suitable fly height actuator, such as a heater or a piezoelectric actuator, operable to actuate the head vertically over the disk in order to maintain a target fly height. The control circuitry 20 may comprise a servo control system operable to compare a measured fly height to a target fly height to generate a fly height error used to generate a dynamic fly height (DFH) control signal 73 (FIG. 2A) similar to the servo control system that controls the radial position of the head. In one embodiment, feed-forward compensation values 56 are generated in response to the disturbance signal 21 for use in the fly height servo control system.

Figure 3:
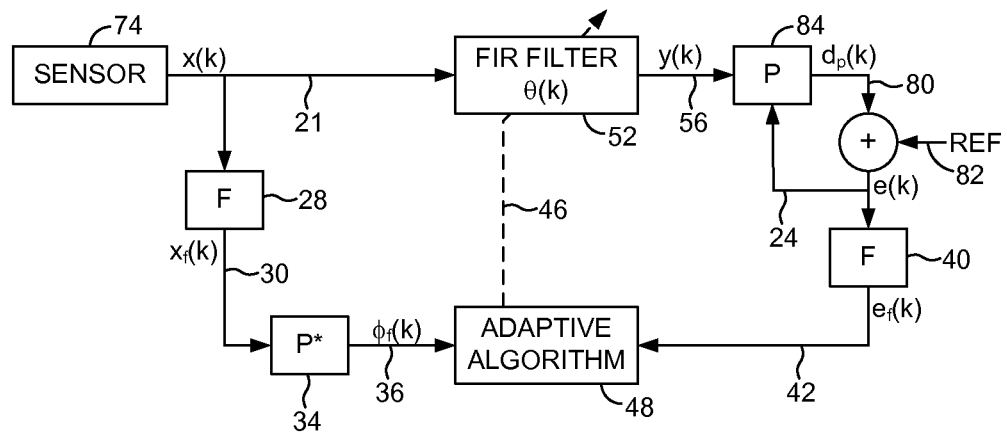
FIG. 3 shows a servo control system according to an embodiment of the present invention, including feed-forward compensation values that compensate for a disturbance.

An external vibration applied to the disk drive or degradation and/or malfunction of the spindle motor that rotates the disks may induce a disturbance in one or more of the servo control systems that actuate the head over the disk (radially or vertically). The vibration may be detected in any suitable manner, such as by evaluating the read signal 66 emanating from the head 18, or by using a suitable electronic sensor 74 as shown in the embodiment of FIG. 3. Any suitable electronic sensor 74 may be employed in the embodiments of the present invention, such as a suitable accelerometer which detects a force (e.g., linear and/or rotational) applied to the disk drive that causes a corresponding vibration.

Figure 4A:
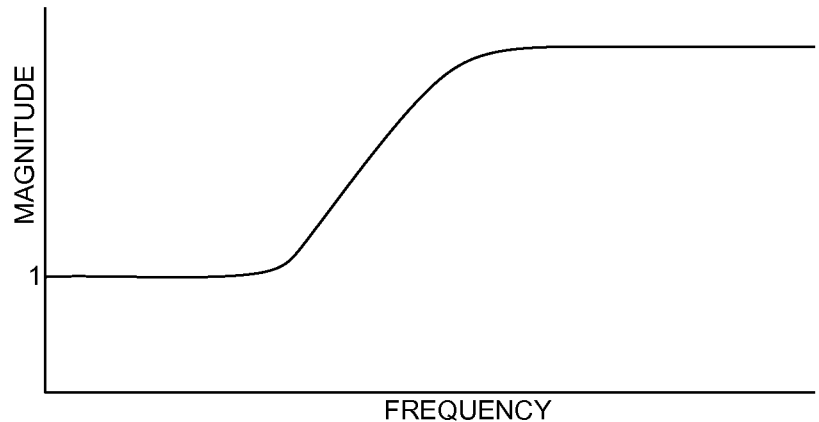
FIG. 4A shows an embodiment of the present invention wherein filtering the disturbance signal and the error signal boosts a high frequency component of the disturbance signal.

In one embodiment, it may be desirable to boost a high frequency component of the disturbance signal. Accordingly in this embodiment, the frequency response of the first filter 28 and the second filter 40 in FIG. 3 comprises a unity gain up to a target frequency and a boosting gain beyond the target frequency as illustrated in FIG. 4A. In one embodiment, the phase response of the first filter 28 and the second filter 40 is substantially unity for all frequencies to avoid inducing a delay into the filtered disturbance signal 30 and filtered error signal 42.

Figure 4B:
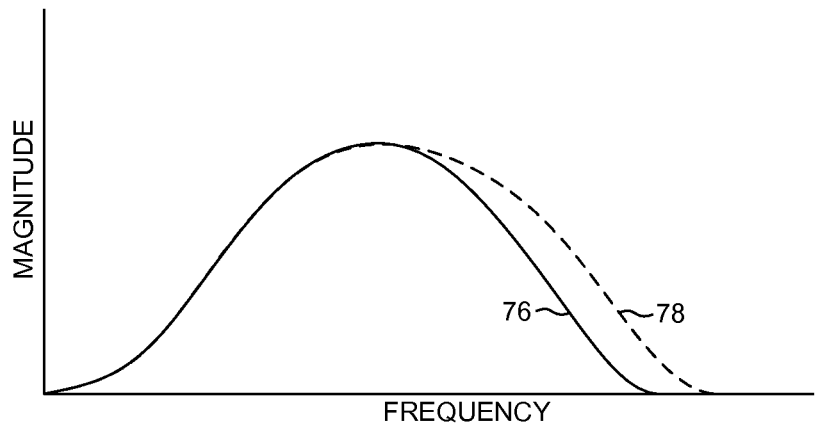
FIG. 4B shows an embodiment of the present invention wherein filtering the disturbance signal and the error signal extends a bandwidth of an electronic sensor for sensing the disturbance signal.

In one embodiment it may be desirable to boost the high frequency component of the disturbance signal 21 generated by an electronic sensor 74 in order to increase the effective bandwidth of the electronic sensor 74. This embodiment is illustrated in FIG. 4B wherein filtering the disturbance signal 21 and the error signal 24 may increase the bandwidth of the electronic sensor 74 from frequency response 76 to frequency response 78. Increasing the effective bandwidth of the electronic sensor 74 may improve the performance of the servo control system 84 by improving the disturbance compensation provided by the feed-forward compensation values 56.

In the embodiment of FIG. 3, a measured position 80 of the head 18 (radial or vertical) is compared to a reference position 82 to generate the error signal 24. The error signal 24 may be input into the servo control system 84 as a feedback control signal to a suitable compensator. The feed-forward compensation values 56 may be used to adjust any suitable control signal within the servo control system 84, such as by modifying the error signal 24 input into the compensator, or by modifying the output of the compensator (the control signal applied to an actuator).

Any suitable adaptive algorithm 48 may be employed to adapt the adaptive filter 52 in response to the filtered disturbance signal 30 and the filtered error signal 42. In one embodiment, the adaptive algorithm 48 implements a Filtered-X Least Mean Square (LMS) algorithm with attempts to minimize the following equation:

$$E(e_f(k)^2)=E[(F(z^{-1})e(k))^2].$$

Any suitable adaptive filter 52 may also be employed, wherein in one embodiment the adaptive filter 52 comprises a finite impulse response (FIR) filter having coefficients θ(k) wherein the control circuitry 20 is operable to adapt the adaptive filter 52 according to:

$$\theta(k+1)=\theta(k)+\mu(k)\phi_f(k)e_f(k)$$

where μ represents a learning coefficient, $\phi_f(k)$ represents the compensated disturbance signal 36, and $e_f(k)$ represents the filtered error signal 42. In one embodiment, the learning coefficient μ is updated according to:

$$\mu(k)=\beta/(\epsilon+\phi_f(k)^T\phi_f(k))$$

if $\mu(k)>\mu_{max},\mu(k)=\mu_{max}$; else if $\mu(k)<\mu_{min},\mu(k)=\mu_{min}$ where β is a suitable scalar, and ϵ is a small positive number to avoid division by zero. With the filtered (weighted) error signal 42 and the adaptation regressor $\phi_f(k)$ 36, the modified Filtered-X LMS algorithm in the above-described embodiment may be considered a Filtered-X weighted-error normalized LMS (WE-NLMS) algorithm.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head; and
   control circuitry comprising a servo control system operable to actuate the head over the disk, the control circuitry operable to:
   generate a disturbance signal in response to a vibration;
   generate an error signal of the servo control system;
   filter the disturbance signal with a first filter comprising a frequency response to generate a filtered disturbance signal;
   filter the filtered disturbance signal with a model of the servo control system to generate a compensated disturbance signal;
   filter the error signal with a second filter comprising the frequency response of the first filter to generate a filtered error signal;
   generate an adaptation control signal in response to the compensated disturbance signal and the filtered error signal;
   adapt an adaptive filter in response to the adaptation control signal, wherein the adaptive filter filters the disturbance signal to generate feed-forward compensation values; and apply the feed-forward compensation values to the servo control system to compensate for the vibration.

2. The disk drive as recited in claim 1, wherein the servo control system actuates the head radially over the disk.

3. The disk drive as recited in claim 2, wherein the error signal represents a difference between a measured radial location and a reference radial location.

4. The disk drive as recited in claim 1, wherein the servo control system actuates the head vertically over the disk.

5. The disk drive as recited in claim 4, wherein the error signal represents a difference between a measured fly height and a reference fly height.

6. The disk drive as recited in claim 1, wherein the control circuitry comprises an electrical sensor operable to generate the disturbance signal.

7. The disk drive as recited in claim 6, wherein the frequency response of the first and second filter increases an effective bandwidth of the electrical sensor.

8. The disk drive as recited in claim 1, wherein the control circuitry is operable to generate the disturbance signal in response to a read signal emanating from the head.

9. The disk drive as recited in claim 1, wherein the frequency response of the first and second filter boosts a high frequency component of the disturbance signal.

10. The disk drive as recited in claim 1, wherein the control circuitry is operable to adapt the adaptive filter according to:

$$\theta(k+1)=\theta(k)+\mu(k)\phi_f(k)e_f(k)$$

where:
$\theta$ represents coefficients of the adaptive filter;
$\mu$ represents a learning coefficient;
$\phi_f(k)$ represents the compensated disturbance signal; and
$e_f(k)$ represents the filtered error signal.

11. A method of operating a disk drive, the disk drive comprising a head and a disk, the method comprising:
  generating a disturbance signal in response to a vibration;
  generating an error signal of a servo control system;
  filtering the disturbance signal with a first filter comprising a frequency response to generate a filtered disturbance signal;
  filtering the filtered disturbance signal with a model of the servo control system to generate a compensated disturbance signal;
  filtering the error signal with a second filter comprising the frequency response of the first filter to generate a filtered error signal;
  generating an adaptation control signal in response to the compensated disturbance signal and the filtered error signal;
  adapting an adaptive filter in response to the adaptation control signal, wherein the adaptive filter filters the disturbance signal to generate feed-forward compensation values; and
  applying the feed-forward compensation values to the servo control system to compensate for the vibration.

12. The method as recited in claim 11, wherein the servo control system actuates the head radially over the disk.

13. The method as recited in claim 12, wherein the error signal represents a difference between a measured radial location and a reference radial location.

14. The method as recited in claim 11, wherein the servo control system actuates the head vertically over the disk.

15. The method as recited in claim 14, wherein the error signal represents a difference between a measured fly height and a reference fly height.

16. The method as recited in claim 11, wherein the disk drive comprises an electrical sensor operable to generate the disturbance signal.

17. The method as recited in claim 16, wherein the frequency response of the first and second filtering increases an effective bandwidth of the electrical sensor.

18. The method as recited in claim 11, further comprising generating the disturbance signal in response to a read signal emanating from the head.

19. The method as recited in claim 11, wherein the frequency response of the first and second filtering boosts a high frequency component of the disturbance signal.

20. The method as recited in claim 11, further comprising adapting the adaptive filter according to:

$$\theta(k+1)=\theta(k)+\mu(k)\phi_f(k)e_f(k)$$

where:
$\theta$ represents coefficients of the adaptive filter;
$\mu$ represents a learning coefficient;
$\phi_f(k)$ represents the compensated disturbance signal; and
$e_f(k)$ represents the filtered error signal.

\* \* \* \* \*